United States Patent [19]

Swindler et al.

[11] Patent Number: 5,477,017
[45] Date of Patent: Dec. 19, 1995

[54] ELECTRIC RACKING DEVICE FOR RACKING CIRCUIT BREAKERS INTO SWITCHGEAR

[75] Inventors: David L. Swindler, Murfreesboro; Gary T. Jones, Antioch, both of Tenn.

[73] Assignee: Square D Company, Palatine, Ill.

[21] Appl. No.: 213,326

[22] Filed: Mar. 15, 1994

[51] Int. Cl.$^6$ ........................................... H01H 9/00
[52] U.S. Cl. ........................ 200/50 AA; 361/605
[58] Field of Search .................... 200/50 A, 50 AA; 361/605–621

[56] References Cited

U.S. PATENT DOCUMENTS

| | | | |
|---|---|---|---|
| 3,716,684 | 2/1973 | McMillen et al. | 200/50 AA |
| 4,317,160 | 2/1982 | Tillson et al. | 200/50 AA |
| 4,396,813 | 8/1983 | Hesselbart et al. | 200/50 AA |
| 5,164,883 | 11/1992 | Little et al. | 361/609 |
| 5,200,585 | 4/1993 | Davies | 200/50 AA |

*Primary Examiner*—J. R. Scott
*Attorney, Agent, or Firm*—Larry I. Golden; Kareem M. Irfan; Wayne Stoppelmoor

[57] ABSTRACT

A racking assembly is provided for racking a circuit breaker into and out of electrical switchgear having a cell adapted to receive the circuit breaker and a cell door for enclosing the circuit breaker within the cell, the racking assembly includes a shaft having a first end adapted to be coupled to the circuit breaker and a motor coupled to a second end of the shaft for applying a rotational torque to the shaft. An anti-rotation assembly is coupled to the motor for preventing the motor from rotating when it is applying the rotational torque to the shaft.

25 Claims, 4 Drawing Sheets

5,477,017

ELECTRIC RACKING DEVICE FOR RACKING CIRCUIT BREAKERS INTO SWITCHGEAR

FIELD OF THE INVENTION

This invention relates generally to racking devices for racking large circuit breakers into switchgear cells and, more specifically, to remote controlled electric racking devices having an anti-rotation assembly that prevents the racking devices from rotating.

BACKGROUND OF THE INVENTION

In the electrical power distribution field, draw-out type voltage circuit breakers are quite large and are usually housed in corresponding circuit breaker cells of switchgear. Since such large circuit breakers may be installed in energized circuit breaker cells, it is preferred that some form of remote electrical means be employed for the installation process so that personnel performing the installation operation can be positioned several tens of feet away from the energized equipment. For this purpose, some mechanical means, such as racking devices, are employed to engage ("rack-in") or withdraw these large circuit breakers into or from contact with the electrical power conductors located at the rear of the switchgear cells.

Racking-in or withdrawing a circuit breaker is typically accomplished using a detachable hand crank which is inserted into a circuit breaker racking mechanism having cooperative cranks and gearing which moves the circuit breaker within the cell as a function of turning the crank. Typically, the crank moves horizontally with the circuit breaker as it moves in and out of the cell. When the operation is complete the crank is removed from the circuit breaker and used on other circuit breakers or placed into storage. Racking-in or withdrawing of the circuit breaker is typically done with the circuit breaker access door of the switchgear cell open. However, in applications where enhanced personnel protection is desired, it is sometimes required that the circuit breaker be racked-in or out with the door closed. In these cases, the access door is closed and the hand crank is inserted through a hole in the door. As the circuit breaker moves, the crank moves in and out of the hole in the door with the movement of the circuit breaker.

Where it is necessary to have a remote electric racking device that will perform the above-described tasks, traditional racking device designs are too complex and cannot be implemented economically. Hence, there is a need for a racking assembly of the above kind which can be remote controlled, can be economically implemented that is easier to use and provides additional safety to the operator. Additionally, remote controlled racking assemblies require an anti-rotation means for preventing the racking assembly from rotating when the circuit breaker is being racked in.

Such an electric racking device should fulfill at least four requirements: 1) the remote racking device should be able to be moved from one circuit breaker cell to another without requiring the permanent mounting of a motor in each switchgear cell or each circuit breaker; 2) when the electric racking device is connected to the moving circuit breaker, it must move horizontally with the circuit breaker as it moves; 3) the electric racking device should be attachable to the outside of the cell door such that once the cell door is closed it can always remain closed after the circuit breaker is placed into the desired position and 4) the device should be designed such that it can be used with switchgear equipment already in service with minimum retrofitting expense.

SUMMARY OF THE INVENTION

It is a general object of the present invention to provide an electric racking device for racking a circuit breaker into switchgear.

It is a more specific object of the present invention to provide an electric racking device that will include components which prevent the racking device from rotating.

In accordance with a preferred embodiment of the present invention a racking assembly is provided for racking a circuit breaker into and out of electrical switchgear having a cell adapted to receive the circuit breaker and a cell door for enclosing the circuit breaker within the cell, the racking assembly includes a shaft having coupling means coupled to a first end of the shaft for coupling the electric racking assembly to the circuit breaker and drive means coupled to a second end of the shaft for applying a rotational torque to the shaft. Anti-rotation means is coupled to the drive means for preventing the drive means is from rotating when the drive means is applying the rotational torque to the shaft.

In accordance with another aspect of the preferred embodiment of the present invention a circuit breaker racking device is provided which includes a motor and remote control means coupled to the motor for remotely controlling the motor, the remote control means is adapted to receive electrical power from an external power source and transferring the electrical power to the motor. A shaft being coupled at its first end to the motor is provided having coupling means integral to a second end for coupling the electric racking device to the circuit breaker. An anti-rotation means is coupled to the motor for preventing the motor from rotating when the motor provides a rotational torque to the shaft.

In accordance with yet another aspect of the present invention a racking device is provided having a motor with a torque limiter coupled thereto. A shaft is coupled to the torque limiter at one end and having a flat extension portion extending from the other end, the shaft being rotated when the motor is energized. A hooked-shape extension extends upwardly from the extension portion for engagement with a circuit breaker racking mechanism thereby coupling the electric racking device to the racking mechanism. An Anti-rotation assembly is coupled to the motor at one end and coupled to a switchgear cell door at the other end for preventing the motor from rotating when the motor provides a rotational torque to the shaft. A controller is coupled to the motor for energizing the motor thereby rotating the shaft and racking the circuit breaker into the cell.

BRIEF DESCRIPTION OF THE DRAWINGS

Other objects and advantages of the invention will be apparent from the following detailed description and the accompanying drawings in which.

DETAILED DESCRIPTION OF THE PREFERRED EMBODIMENTS

For a better understanding of the present invention together with other and further advantages, and capabilities thereof, reference is made to the following disclosure and appended claims in connection with the above-described drawings.

Figure 1:
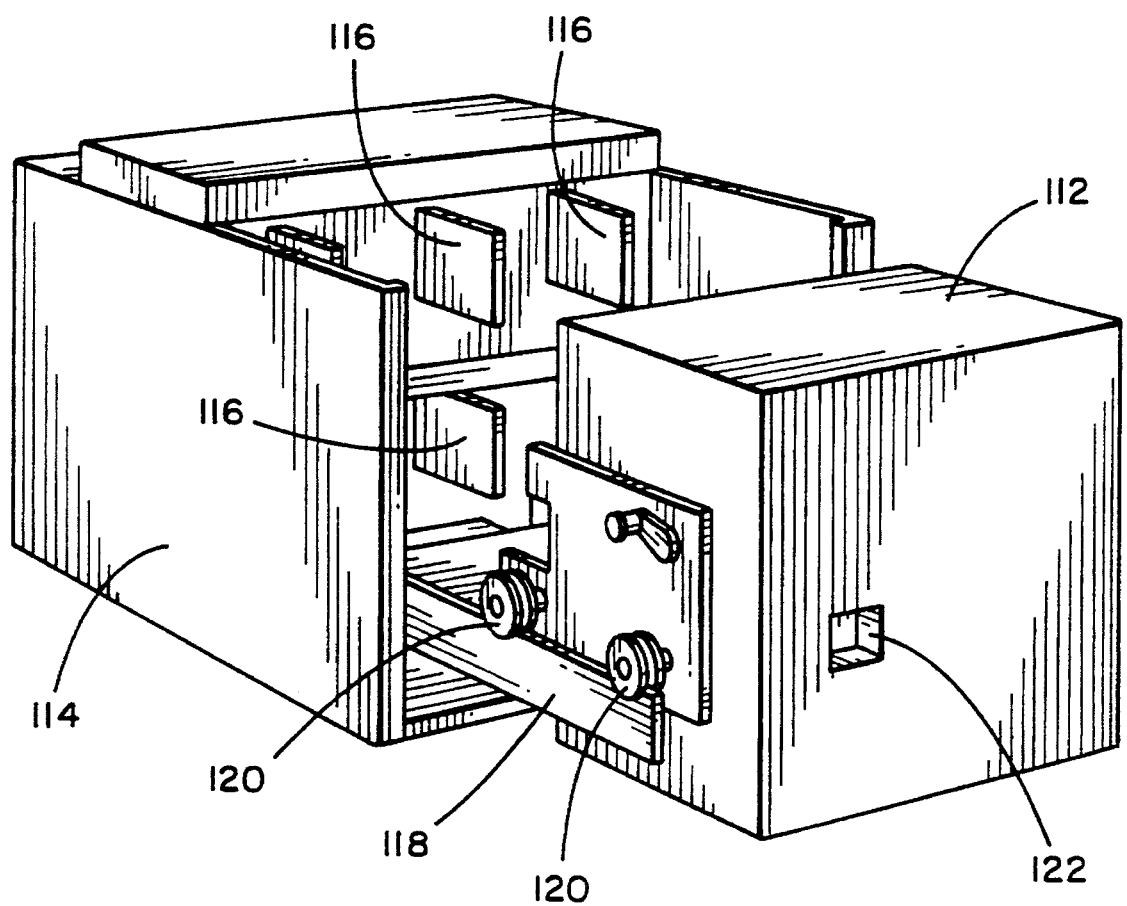
FIG. 1 is a perspective view of a prior art circuit breaker.

Referring to FIG. 1, a draw-out type circuit breaker 112 is shown conventionally mounted for movement into and out of a switchgear cell 114 for connection to a plurality of electrical connectors 116. The circuit breaker 112 is mounted on a pair of pullout rails 118 by means of rollers 120. A window 122 in front of the circuit breaker 112 is provided for enabling a tool, such as an electric racking device 10 (FIG. 2), to be coupled for engaging a conventional racking mechanism (not shown) within the circuit breaker 112. The racking mechanism may, for example, be of the type described in U.S. Pat. No. 4,693,132 issued Sep. 15, 1987, entitled "Drive Mechanism For Drawout High Amperage Multi-pole Circuit Breaker" or U.S. Pat. No. 4,728,757, issued Mar. 1, 1988, entitled "Interlock Scheme For Drawout High Amperage Multi-pole Circuit Breaker"; both patents are assigned to Square D Company and the disclosures therein are incorporated herein by reference. These two references show conventional racking mechanisms and the present invention may be adapted to be coupled to them.

Figure 2:
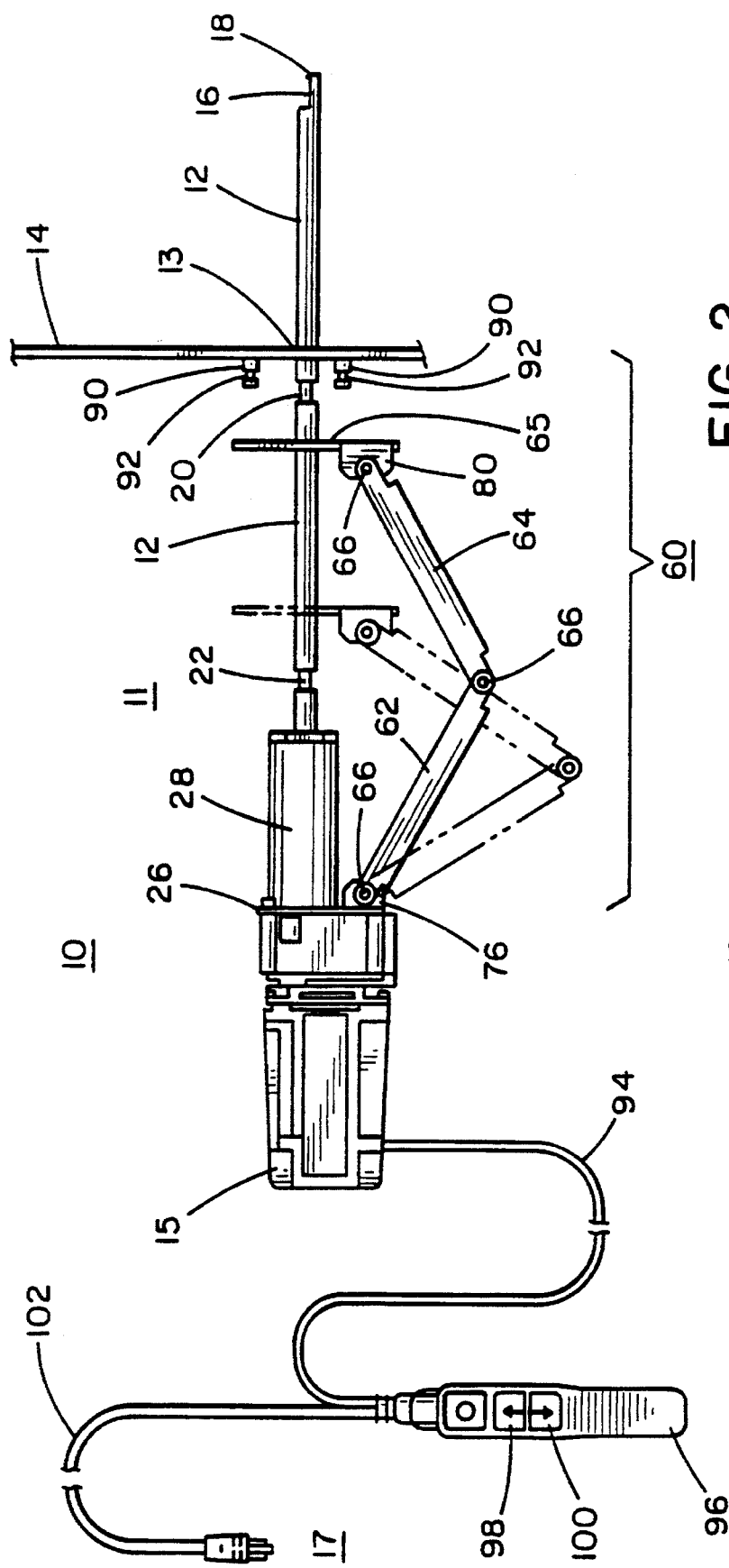
FIG. 2 is a representation perspective view of an electric racking device which incorporates the subject matter of the present invention.

Referring to FIG. 2, the electric racking device 10 is shown in a perspective view including a racking assembly 11 and an associated remote control assembly 17. The racking assembly 11 includes a circular operating shaft 12 coupled at one end to a drive means for applying a rotating torque, such as an electric motor 15, and coupled at the other end to a means for coupling the racking assembly 11 to the circuit breaker racking mechanism. The racking assembly 11 also includes a means for limiting the torque applied to the shaft 12 and an anti-rotation means for preventing the drive means from rotating when it is applying a torque to the shaft 12.

Figure 3:
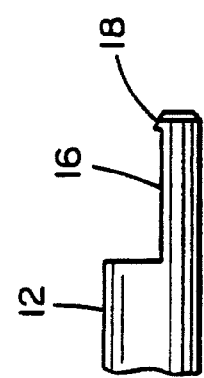
FIG. 3 is a plan perspective view of a flat extension of the shaft utilized in the electric racking device of FIG. 2.

FIG. 2 shows the circular operating shaft 12 extending through an aperture or racking hole 13 in a switchgear cell door 14. The switchgear cell door has a conventional guide tube (not shown), which is provided with most cell doors, positioned in the cell door hole to assist in positioning the racking assembly 11 or any other conventional racking device. The motor 15 is coupled to one end of the shaft 12 and extending from the other end of the shaft 12 is a flat extension 16 having a hook 18 (Better shown in FIG. 3) disposed thereon. The shaft 12, flat extension 16 and hook 18 extend into the racking mechanism (not shown) of the circuit breaker 112 (FIG. 1) that is to be "racked" into the switchgear. The racking assembly 11 is coupled to the circuit breaker racking mechanism when the flat extension 16 mates with a corresponding flat metal coupling portion within the racking mechanism and then the shaft 12 is rotated causing hook 18 to bite into the flat metal coupling portion. As the shaft 12 is rotated and the hook 18 bites into the racking mechanism a significant amount of axial and horizontal friction is developed thereby coupling the racking device 10 to the racking mechanism and providing the coupling necessary to move the circuit breaker into the switchgear cell. The racking assembly 11 is totally supported by the shaft 12 in a cantilevered fashion by the hook 18 being captured in the racking mechanism and the shaft 12 being supported by the guide tube positioned in the hole in the switchgear cell door. As the motor 15 provides a rotational torque to the shaft 12, the shaft rotates and the racking mechanism converts the rotational movement of the shaft 12 into linear movement of the circuit breaker 112 (FIG. 1) along the rails 120. Since the electric racking device 10 is coupled to the circuit breaker racking mechanism it follows the circuit breaker as it moves both in and out of the switchgear cell 114.

The shaft 12 has milled grooves 20 and 22 having green and red tape, respectively, disposed therearound for indicating the position of the circuit breaker, either racked-out or racked-in, respectively. When the circuit breaker is in the racked-in position, the groove 22 will be flush with the cell door 14 and when the groove 20 is flush with the cell door 14, the circuit breaker is in the racked-out position. Although, this embodiment uses green and red tape in the grooves to indicate the extreme position of the circuit breaker, any other colors or form of indication may be used. Additionally, the grooves could be provided with some other form of indication means therein or the tape could be disposed immediately around the shaft instead of being disposed in grooves.

Figure 4:
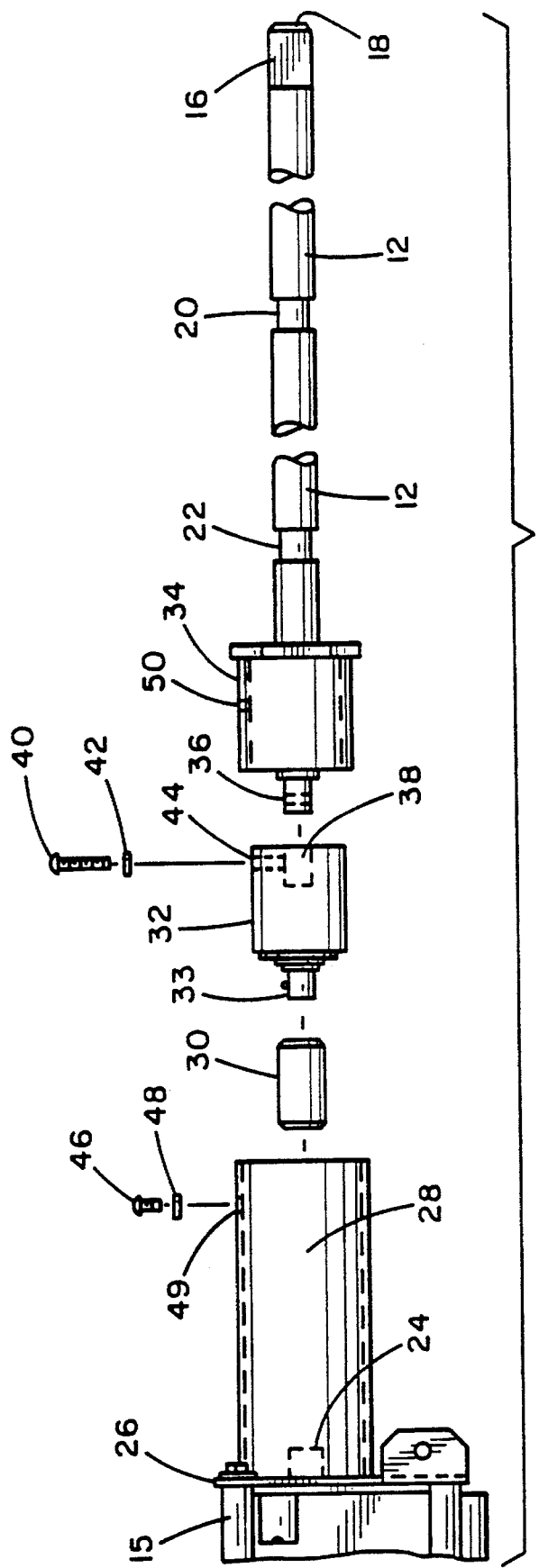
FIG. 4 is an exploded perspective view of the torque limiter and support tube used in the electric racking device of FIG. 2.
Figure 5:
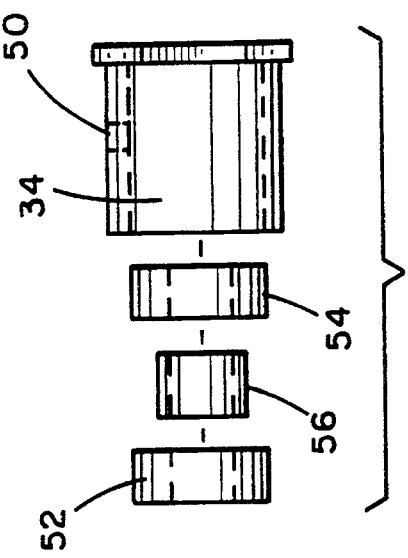
FIG. 5 is an exploded perspective view of the collar assembly used in the electric racking device of FIG. 2.
Figure 6:
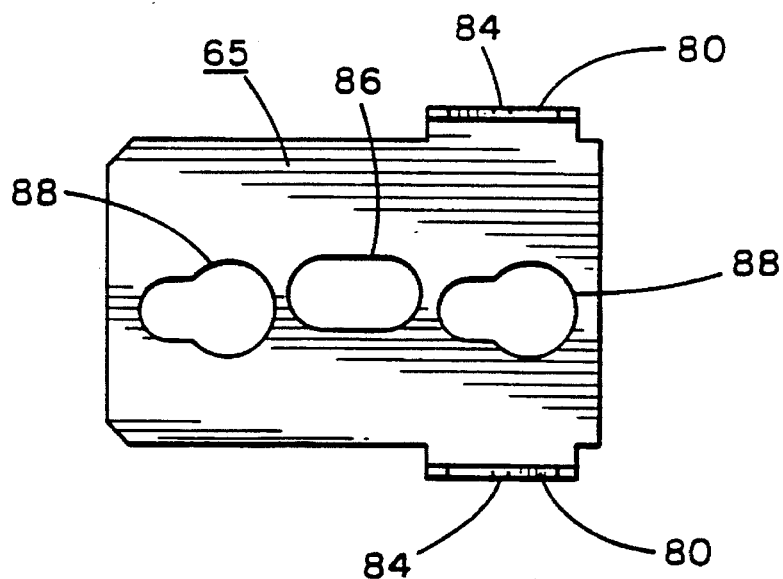
FIG. 6 is a plan perspective side view of the keyhole plate used in the electric racking device of FIG. 2.
Figure 7:
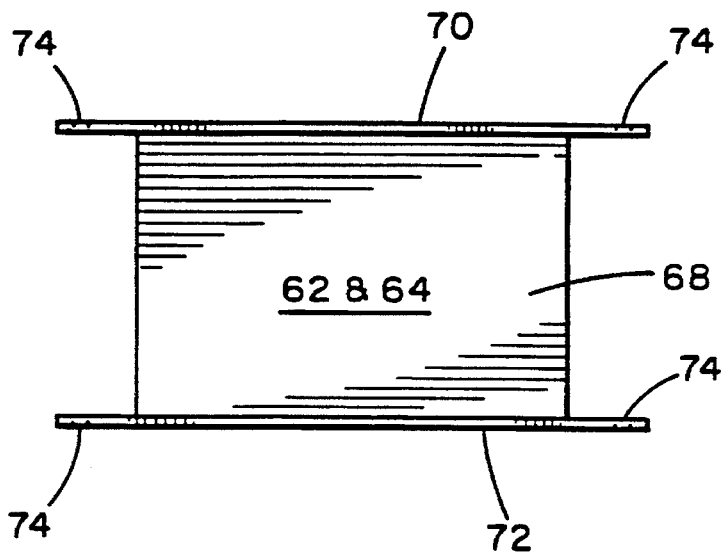
FIG. 7 is a plan perspective top view of a channel link used in the electric racking device of FIG. 2.
Figure 8:
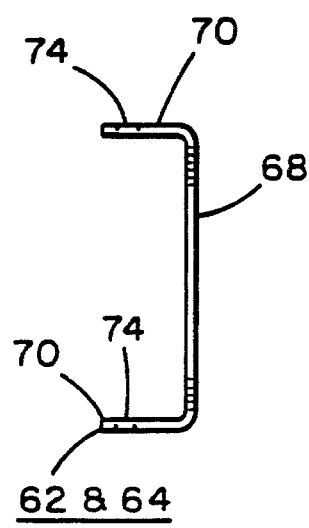
FIG. 8 is a plan perspective side view of a channel link used in the electric racking device of FIG. 2.
Figure 9:
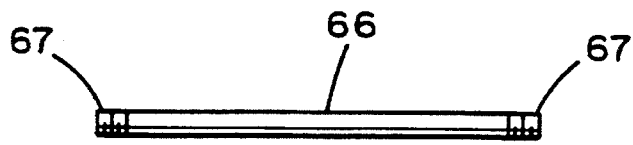
FIG. 9 is a plan perspective view of a threaded rod used in the electric racking device of FIG. 2.

Referring now to FIG. 4 and 5, the motor 15 (partially shown) is shown having a hex shaped drive shaft 24. A bracket 26 is secured to the motor 15 using standard bolts. The bracket 26 has a support tube 28 disposed thereto for housing a standard hex socket 30, a torque limiter 32 and a beating collar 34. The torque limiter 32 prevents any additional torque from being applied to the shaft once the circuit breaker is completely racked-in. The drive shaft 24 is connected to one end of the socket 30 and a square shaft 33 extending from the torque limiter 32 is connected to the other end of the socket 30. The end of the shaft 12 opposite of the end that is to be inserted into a circuit breaker is machined to a square shape and has a threaded hole 36 therein. The square end of the shaft is positioned in a square cavity 38 in the torque limiter 32 and a screw 40 is passed through a washer 42 and a hole 44 and threaded into the threaded hole 36 to secure the torque limiter 32 to the shaft 12. The collar 34 is secured to the support tube 28 by a screw 46 and washer 48 assembly being passed through a hole 49 in the support tube 28 and threaded into a threaded hole 50 in the collar 34. The specific shapes of the ends of the shafts and socket are not important for the present invention and are only shown for example, all that matters is that the components are coupled together. Two bearings 52 and 54 surrounding the shaft 12 are enclosed inside the collar 34 and are spaced apart by a spacer 56.

The torque limiter 32, in the present embodiment is available as Model No. 12A from The X-4 Corporation of North Billericra, Me., is used to limit torque applied by the motor 15 to the operating shaft 12 and consists of spring loaded balls (not shown), the loading of which can be adjusted to control the amount of torque limit desired. The torque setting is adjusted so that all of the rotational torque from the drive shaft 24 is transferred to the operating shaft 12 when the circuit breaker is racked-out. However, the torque setting is also adjusted so that when the circuit breaker is racked-in, the rotating torque of the drive shaft 24 is not transferred to the operating shaft 12; therefore the operating shaft 12 is stopped from continuing to rotate and damage parts in the circuit breaker or switchgear cell. When the torque limiter 32 device reaches the torque setting, the balls begin to ride in and out of cavities within the torque limiter 32. This causes a loud clicking sound which signals the operator to turn off the electric racking device 10. As the circuit breaker reaches a racked-in position any further linear motion is prohibited thereby the load on the operating shaft 12 sharply increases causing the torque limiter 32 to operate preventing any further torque applied to the shaft and thereby make the clicking sound.

Referring back to FIG. 2 and 6–9, when the motor 15 is providing a rotational torque to the shaft 12 it is prohibited from rotating along with the shaft 12 by the anti-rotation means which is comprised of a collapsing scissors assembly 60 being coupled at one end to the motor 15 and coupled to the cell door 14 at the other end. The scissors assembly 60 provides no support to the racking assembly 11, it simply keeps the motor 15 from rotating while the motor 15 applies a rotational torque to the operating shaft 12 thereby moving the racking assembly 11 horizontally in relation to the switchgear cell door.

The scissors assembly 60 has a pair of similar U-shaped first and second channel links 62 and 64, respectively, rotationally connected to each other. The channel links 62 and 64 are formed from one piece of metal and formed to have a bottom portion 68 and two side portions 70 and 72. The channel links 62 and 64 have holes 74 in their side portions to allow a threaded rod 66 to pass therethrough. The threaded rod 66 has threaded portions 67 at each end for allowing bolts to be threaded thereto thereby securing the channel links 62 and 64 to each other at one of their ends and to tabs at their opposite ends. The first channel link 62 is connected to the second channel link 64 at one end and is connected, at the other end, to a pair of tabs 76 formed on the motor bracket 26. One end of the second channel link 64 is connected to the first channel link 62 and the other end is connected to a pair of tabs 80 formed on a keyhole plate 65. A threaded rod 66 passes through holes 84 in the pair of plate tabs 80 and the holes 74 in the second channel link sides. Bolts are utilized to secure the rods in place.

The scissors assembly 60 is coupled to the cell door 14 by the plate 65 engaging with a pair of knobs 90 disposed on the cell door. The plate 65 has a slotted aperture 86 where the operating shaft 12 passes therethrough and a pair of key-hole shaped apertures 88 having a larger portion and a smaller portion. The knobs 90 have a groove 92 machined therein and are installed into holes in the cell door 14 immediately above and below the racking hole 13 in the cell door 14 where the shaft 12 of the racking device is inserted. The knobs 90 are installed into pre-existing holes that are being utilized to mount a standard racking crank guiding tube on the door. The larger portions of each key-hole aperture 88 are larger than the knobs 90 and thereby pass over the knobs 90 and then slid vertically downward into the grooves 92. The plate 65 maintains its position by gravity and friction between the edges of the key-hole slots and the knob grooves 92. The slotted shape of the aperture 86 allows the plate 65 to be moved vertically while the shaft 12 passes the aperture 86.

Referring once again to FIG. 2, the motor 15 is a universal type motor with a commutator armature and field coils and should be equipped with a gear train to reduce the shaft speed and to produce sufficient torque to move the circuit breaker at a reasonable speed; in the present embodiment, a commercial motor available from Ryobi Motor Products Corp. of Pickens, S.C. as Model No. 5070 was used.

The motor 15 is controlled by the remote control assembly 17 which includes a hand held remote control 96, a long four wire cable 94 and a power cord 102. The long four wire cable 94 connects the motor 15 to the hand held remote control 96 having two push buttons 98 and 100 which are marked with arrows indicating "in" and "out", respectively, and are mechanically interlocked such that only one button can be operated at time. In the present embodiment, a commercial remote control available from Telemecanique of France as Model No. XACA205 was used. 120 Vac electrical power is supplied to the remote control 96 through the power cord 102 and transferred to the motor 15 through the cable 94. The wires from the cable 94 are connected to the motor 15 such that the relation of the field and armature windings (not shown) of the motor 15 are connected so as to rotate the motor drive shaft 24 (FIG. 4) in the direction desired. Additionally, the connections are such that when the buttons 98 and 100 are released the armature is short-circuited creating a small amount of dynamic breaking to slow the motor 15 and bring the drive shaft 24 to a stop more quickly. The horizontal movement of the racking assembly 11 is a clear visual indication of the movement of the circuit breaker behind the closed switchgear cell door 14. This embodiment of the present invention is shown with the remote control 96 being coupled to the motor 15 with a long four wire cable 94, however, the four wire cable may be any length, from long to short. Additionally, the remote control 96 could be an integral part of the motor 15.

A typical operation for racking the circuit breaker into the switchgear cell would be as follows: A circuit breaker would be installed into the switchgear cell and stationed in its racked-out position. The cell door 14 would then be closed and secured. With the scissors assembly 60 collapsed (shown as dashed lines in FIG. 2), the electric racking device operating shaft 12 is inserted into the racking hole 13 in the cell door and into the circuit breaker through the window 122. While pushing the shaft 12 into the circuit breaker racking mechanism, the racking assembly 11 is rotated through 360 degrees or less to ensure that the flat extension 16 on the end of the operating shaft 12 engages with the flat coupling portion within the circuit breaker racking mechanism. Once the coupling is engaged, it is important that the holes in the keyhole plate are aligned with the knobs on the cell door, therefore, the racking assembly 11 is rotated such that the scissors assembly 60 is pointing downward. Once the keyholes 88 are aligned with the knobs 90, the keyhole plate 65 is slid over the operating shaft 12 to engage with the knobs 90. The key-hole slots 88 are slid horizontally over the knobs 90 and then slid downward to lock in position.

The four wire cable 94 is then extended with the operator moving a safe distance away from the equipment with the remote control 96 to a location where the power cord 102 is plugged into a regular 120 Vac power source. The "in" button 98 is pressed and the motor starts rotating the operating shaft 12. The circuit breaker racking mechanism converts the rotational movement of the operating shaft 12 into linear movement of the circuit breaker into the cell. When the circuit breaker begins to move, the racking assembly 11 is pulled by the circuit breaker. The operator can see the racking assembly 11 moving, see the operating shaft 12 turning and hear the motor 15 running. The operation will stop whenever the button 98 is released. The operation will continue by pressing the "in" button 98 again. Anywhere in mid position the operator can release the "in"

button 98 and press the "out" button 100 to reverse the operation. The operator can be assured that the operation is complete by observing the fact that the electric racking assembly 11 stops moving horizontally and the clicking sound of the torque limiter 32 is heard. If the ambient noise level is too high to hear the torque limiter 32, the operator can simply hold the "in" button 98 down for a reasonable length of time after he observes that the racking assembly 11 has stopped moving horizontally. The operator can confirm that the circuit breaker has been racked to its full intended position by observing the color coded taped grooves 20 and 22 in the operating shaft 12 in relation to the front of the door. If the groove with the red tape (groove 22) is not flush with the cell door then the operator should investigate the proper position of the circuit breaker because the circuit breaker may not be fully racked in.

After the operation is complete, the operator unplugs the power cord 102, slides the keyhole plate 65 up and unhooks it from the knobs 90, and then slides the operating shaft 12 out of the hole in the cell door.

To withdraw the breaker from the switchgear, the above-described operation is repeated, with one exception, the "out" button 100 on the remote control 96 is pressed instead of the "in" button 98.

Except for latching the keyhole plate 65 onto the door knobs 90 and plugging the device into a power source, the operation is similar and is as efficient as using a manual racking crank. The racking assembly 11 can be carded, installed, and operated by one man. It is about the size, weight and configuration as a large electric drill motor.

While there have been shown and described what are at present considered the preferred embodiments of the invention, it will be obvious to those skilled in the art that various changes and modifications may be made therein without departing from the scope of the invention as defined by the appended claims. For example, the hook portion at the end of the shaft could be replaced with any type of engagement device such as a socket or screw driver assembly.

What is claimed is:

1. A racking assembly for racking a circuit breaker into and out of electrical switchgear having a cell which receives the circuit breaker and a cell door for enclosing the circuit breaker within the cell, said electric racking assembly comprising:
   a shaft;
   coupling means coupled to a first end of said shaft for coupling said electric racking assembly to the circuit breaker;
   a motor coupled to a second end of said shaft for applying a rotational torque to said shaft; and
   anti-rotation means coupled to said motor for preventing said motor from rotating when said motor is applying the rotational torque to said shaft.

2. A racking assembly according to claim 1, wherein said coupling means includes a flat extension extending from said first end of said shaft and having a hook extending from said flat extension for engagement with the circuit breaker when said motor is applying the rotational torque to said shaft.

3. A racking assembly according to claim 1, wherein said anti-rotation means comprises first and second links coupled to one another at one of their ends, said first link coupled to said motor at its other end and said second link coupled to a plate at its other end, wherein said plate is secured to the cell door when said motor is applying the rotational torque to said shaft.

4. A racking assembly according to claim 3, wherein said plate has at least one keyhole shaped aperture which is positioned over a knob on the switchgear door when said motor is applying the rotational torque to said shaft.

5. A racking assembly according to claim 4, wherein said plate further having a slotted aperture therein for passage of said shaft therethrough.

6. A racking assembly according to claim 1, wherein said drive means is an electric motor.

7. A racking assembly according to claim 1 further having a torque limiter coupled between said motor and said second end of said shaft for limiting the rotational torque applied to said shaft from said motor.

8. A racking assembly according to claim 1 further having a remote control means coupled to said motor for remotely controlling said motor.

9. An electric racking device for racking a circuit breaker into and out of electrical switchgear having a cell which receives the circuit breaker and a cell door for enclosing the circuit breaker within the cell, said electric racking device comprising:
   a shaft;
   an electric motor coupled to a first end of said shaft for providing a rotational torque to said shaft;
   coupling means integral to a second end of said shaft for coupling said electric racking device to the circuit breaker;
   remote control means coupled to said motor for remotely controlling said motor; and
   anti-rotation means coupled to said motor for preventing said motor from rotating when said motor provides the rotational torque to said shaft.

10. An electric racking device according to claim 9, wherein said coupling means includes a flat extension extending from said second end of said shaft and having a hook extending from said flat extension for engagement with the circuit breaker when said motor is providing the rotational torque to said shaft.

11. An electric racking device according to claim 9, wherein said anti-rotation means comprises first and second U-shaped links coupled to one another at one of their ends, said first link coupled to said motor at its other end and said second link coupled to a plate at its other end, wherein said plate is secured to the cell door when said motor is providing the rotational torque to said shaft.

12. An electric racking device according to claim 11, wherein said plate has at least one keyhole shaped aperture which is positioned over a knob on the switchgear door when said motor is providing the rotational torque to said shaft.

13. An electric racking device according to claim 12, wherein said plate further having a slotted aperture therein for passage of said shaft therethrough.

14. An electric racking device according to claim 9, wherein said shaft having first and second grooves disposed therein for indicating the position of the circuit breaker.

15. An electric racking device according to claim 14, wherein said first groove having a first colored tape disposed therein and said second groove having a second colored tape disposed therein.

16. An electric racking device according to claim 9, further having at least one bearing enclosed in a collar being disposed within a support tube, said support tube is coupled to said motor.

17. A racking assembly according to claim 9, further having a torque limiter coupled between said motor and said first end of said shaft for limiting the rotational torque applied to said shaft, whereby when the circuit breaker is in a racked-in position in the cell, said torque limiter prevents said shaft from rotating.

18. An electric racking device for racking a circuit breaker into a cell in electrical switchgear, the circuit breaker having a racking mechanism and the switchgear having a door for enclosing the circuit breaker in the cell, said electric racking device comprising:

a motor;

a torque limiter coupled to said motor;

a shaft coupled to said torque limiter at one end and having a flat extension portion extending from the other end, said shaft being rotated when said motor is energized;

a coupling portion extending upwardly from said extension portion for engagement with the racking mechanism thereby coupling said electric racking device to the racking mechanism;

anti-rotation means coupled to said motor at one end and coupled to the door at the other end when said motor provides a rotational torque to said shaft for preventing said motor from rotating; and a controller coupled to said motor for energizing the motor thereby rotating said shaft and racking the circuit breaker into the cell.

19. An electric racking device according to claim 18, wherein said shaft further includes first and second grooves therein for indicating the position of the circuit breaker with respect to the switchgear, said first groove has a first colored tape therein and said second groove has a second colored tape therein whereby the color of said second colored tape is a different color than the color of said first colored tape.

20. An electric racking device according to claim 18, wherein said control means is located a distance from said motor, said control means receiving electrical power from an external power source and transferring the electrical power to said motor.

21. An electric racking device according to claim 18, wherein said anti-rotation means comprises first and second U-shaped links coupled to one another at one of their ends, said first link coupled to said motor at its other end and said second link coupled to a plate at its other end.

22. An electric racking device according to claim 21, wherein said plate has at least one keyhole shaped aperture which is positioned over a knob on the door whereby securing said plate to the door when said motor is providing the rotational torque to said shaft.

23. An electric racking device according to claim 18, wherein said plate further having a slotted aperture therein for passage of said shaft therethrough.

24. An electric racking device according to claim 18, further having at least one beating disposed on said shaft.

25. An electric racking device for racking a circuit breaker having a racking mechanism into a switchgear cell, the switchgear cell having a door for securing the circuit breaker therein, said electric racking device comprising:

a shaft coupled to a torque limiter at one end and having a flat extension portion extending from the other end;

a motor coupled to said torque limiter for rotating said shaft;

coupling means integral to said shaft for coupling said shaft to the racking mechanism thereby forcing the circuit breaker into the cell when the motor rotates said shaft, the circuit breaker pulls said electric racking device into the cell as the circuit breaker moves into the cell;

a bracket disposed on said motor;

an anti-rotation assembly coupled to said bracket at one end and coupled to a plate at an opposite end for preventing the motor from rotating when said motor rotates said shaft, said anti-rotation assembly comprising first and second channel links having a bottom portion and two side portions, said first channel link having a first end rotationally secured to said bracket and a second end rotationally coupled to a first end of said second channel link, said second channel link having a second end rotationally coupled to a plate which is secured to the door when said motor rotates said shaft;

position indicating means for indicating the position of the circuit breaker with respect to the switchgear cell; and a controller coupled to said motor for controlling the motor.

* * * * *